(12) United States Patent
Ullein et al.

(10) Patent No.: US 7,108,621 B2
(45) Date of Patent: Sep. 19, 2006

(54) CHAIN TENSIONER

(75) Inventors: Thomas Ullein, Stegaurach (DE); Bolko Schuseil, Adelsdorf (DE)

(73) Assignee: INA Wälzlager Schaeffler oHG, Herzogenaurach (DE)

( * ) Notice: Subject to any disclaimer, the term of this patent is extended or adjusted under 35 U.S.C. 154(b) by 770 days.

(21) Appl. No.: 09/925,013

(22) Filed: Aug. 8, 2001

(65) Prior Publication Data

US 2002/0022541 A1   Feb. 21, 2002

(30) Foreign Application Priority Data

Aug. 8, 2000 (DE) ................. 100 38 606

(51) Int. Cl.
*F16H 7/08* (2006.01)
(52) U.S. Cl. .................................... 474/101
(58) Field of Classification Search ............... 474/101, 474/109, 111, 140
See application file for complete search history.

(56) References Cited

U.S. PATENT DOCUMENTS

| | | | | |
|---|---|---|---|---|
| 4,997,411 A | * | 3/1991 | Breon et al. ............... 474/110 |
| 5,993,341 A | * | 11/1999 | Anderson ................... 474/110 |
| 6,193,623 B1 | * | 2/2001 | Koch et al. ................ 474/110 |
| 6,352,487 B1 | * | 3/2002 | Tada ......................... 474/110 |
| 6,361,458 B1 | * | 3/2002 | Smith ........................ 474/109 |
| 6,383,103 B1 | * | 5/2002 | Fujimoto et al. .......... 474/110 |

FOREIGN PATENT DOCUMENTS

| | | |
|---|---|---|
| DE | 40 35 823 C1 | 12/1991 |
| DE | 196 32 383 A1 | 2/1997 |
| DE | 199 57 527 A1 | 6/2000 |
| EP | 06 86 787 A1 | 12/1995 |
| EP | 09 52 375 A1 | 10/1999 |

* cited by examiner

*Primary Examiner*—Vicky A. Johnson
(74) *Attorney, Agent, or Firm*—Henry M. Feiereisen

(57) ABSTRACT

A tensioner for a chain, includes a tensioner piston bearing upon a chain and guided by a cylinder for movement in the direction of the chain. The cylinder and the piston define a pressure chamber for receiving hydraulic fluid, wherein hydraulic fluid is able to escape from the pressure chamber via a leakage gap. A control member is provided to at least reduce the leakage gap in size, when a pressure in the pressure chamber increases.

30 Claims, 1 Drawing Sheet

US 7,108,621 B2

CHAIN TENSIONER

CROSS-REFERENCES TO RELATED APPLICATIONS

This application claims the priority of German Patent Application Serial No. 100 38 606.7, filed Aug. 8, 2000, the subject matter of which is incorporated herein by reference.

BACKGROUND OF THE INVENTION

The present invention relates, in general, to a tensioner, and more particularly to a chain tensioner as used in chain drives of internal combustion engines for tensioning the chain during operation.

German Pat. No. DE 40 35 823 C1 describes a hydraulic tensioner for traction drives, in particular chain drives in internal combustion engines. A tensioner piston is pressed against the chain and received in a cylinder for longitudinal displacement. The piston and the cylinder together define a pressure chamber for hydraulic fluid. As the piston moves in the direction of the chain to tension it, the pressure chamber expands, thereby creating a negative pressure. As a consequence, a check valve opens and motor oil is able to flow into the pressure chamber. A tensioning of the chain moves the piston inwards away from the chain, so that the pressure chamber is reduced in size. During inward movement of the piston, motor oil migrates from the pressure chamber through a leakage gap. This conventional chain tensioner is further provided with a pressure restrictor valve which opens, when the pressure in the pressure chamber is excessive. Thus, the characteristic damping curve of the chain tensioner becomes softer, once the pressure restrictor valve opens.

The configuration of the leakage gap is essential as far as damping behavior of the chain tensioner is concerned. When dimensioning the leakage gap for a great leakage rate, the chain tensioner acts softer to dampen, e.g., chain knocks, as the piston is deflected to a greater degree. On the other hand, when the leakage rate is small, such chain knocks are damped under fairly small deflections of the piston, whereby greater forces are effective as a consequence of the smaller deflection. Therefore, a hard damping action of the chain tensioner is effected, when the leakage rate is only small.

Damping behavior of the chain tensioner is normally suited in optimum manner to an operating point. A soft damping action may be desired to avoid loud noises generated by the chain drive in the low speed range. The motor exhibits, however, a different operating behavior in the higher speed range, as more motor oil issues out of the pressure chamber through the leakage gap. Since hard chain knocks cannot be precluded, the piston is pushed further inwardly, when dimensioned for soft damping action, so that intake of motor oil into the pressure chamber will be insufficient. As a result, faulty operation of the chain tensioner can be experienced, in particular at higher speeds.

It would therefore be desirable and advantageous to provide an improved chain tensioner to obviate prior art shortcomings and to ensure a reliable operation.

SUMMARY OF THE INVENTION

According to one aspect of the present invention, a chain tensioner includes a tensioner piston bearing upon a chain; a cylinder guiding the piston for movement in a direction of the chain and bounding with the piston a pressure chamber for receiving hydraulic fluid; a leakage gap for migration of hydraulic fluid from the pressure chamber; and a control member for at least reducing the leakage gap in size, when a pressure in the pressure chamber increases.

The present invention resolves prior art problems by providing a control member to at least reduce the leakage gap with increasing pressure in the pressure chamber. This size reduction of the leakage gap includes also the possibility of a complete closing in situations, when this leakage gap is provided in addition to another leakage gap. As a result of the size adjustment of the leakage gap, the characteristic damping curve of the chain tensioner is dependent on the pressure in the pressure chamber and also dependent on the motor speed. In a lower speed range and thus lower fluid pressure in the pressure chamber, the leakage gap expands, which means that the chain tensioner has a soft characteristic damping curve. In a higher speed range and thus greater fluid pressure in the pressure chamber, the leakage gap is smaller, which means that the chain tensioners exhibits a harder characteristic damping curve. In this way, the chain tensioner according to the present invention is best suited to meet the desires of automobile manufactures, namely to provide a chain tensioner that exhibits a characteristic damping curve that varies in response to the motor speed.

The need for an additional pressure relief valve is eliminated, because the leakage gap and its pressure-dependent size reduction—or its closure, when another, preferably constant, leakage gap is provided—can be reliably configured for the intended damping action. Sudden pressure drops, that are encountered during opening of a pressure relief valve, are no longer an issue here because there is no need for a pressure relief valve.

According to another feature of the present invention, the chain tensioner may include a check valve which is passed by hydraulic fluid to enter the pressure chamber. An outward movement of the piston in the direction toward the chain results in a volume expansion of the pressure chamber so that a negative pressure is generated in the pressure chamber, causing an opening of the check valve. As the check valve is open, hydraulic fluid can flow into the pressure chamber. An inward movement of the piston causes a size reduction of the pressure chamber and a pressure increase, so that the check valve closes.

According to another feature of the present invention, the control member may be a valve having a valve body, which bounds the leakage gap and is configured for displacement to at least reduce the leakage gap, when the pressure in the pressure chamber increases. The use of such a valve is especially desired because the force, acting on the valve body, varies as a result of pressure differences in the pressure chamber, whereby the valve body shifts in dependence on the size of this force.

The valve body may clear the leakage gap, when the pressure in the pressure chamber drops below a critical lower level, and at least reduces the leakage gap, when the pressure in the pressure chamber exceeds a critical upper level. Below this critical lower pressure level, the valve body is stationary so that the leakage gap remains constant, even when pressure fluctuations occur below this critical lower pressure level. Above the critical upper pressure level, the valve body occupies a different position and remains then stationary, even when pressure fluctuations occur above this critical lower pressure level. In the range between the critical lower pressure level and the critical upper pressure level, the size of the leakage gap may steadily increase or decrease.

According to another feature of the present invention, the valve body may abut a first stop to then clear the leakage gap. The pressure in the pressure chamber acts on the valve body, when the valve body bears against the first stop. In the event, the force resultant from this pressure and acting on the valve body, exceeds the biasing force by which the valve body is held against the first stop, the valve body is moved away from the first stop, resulting in a change of the leakage gap. The first stop may be formed by a valve seat which demarcates the leakage gap in concert with the valve body. The valve seat allows a reliable positioning of the valve body.

Suitably, the valve body is biased by a valve spring against the first stop. The valve spring is suited to the desired damping behavior. Spring rate and spring force determine the moment of disengagement of the valve body from the first stop and the distance the valve body moves away from the first stop.

According to another feature of the present invention, a second stop may be provided against which the valve body is pushed, as the pressure in the pressure chamber increases, whereby the leakage gap is at least reduced in size, when the valve body abuts the second stop. The second stop is effective, when the pressure in the pressure chamber exceeds the critical upper level. Once the critical upper pressure is reached, the valve body remains against the second stop. Just like the first stop, also the second stop may form a valve seat for the valve body.

Suitably, the valve is in communication with the pressure chamber and may be a check valve with a ball which is biased by a spring to seek engagement in its valve seat. Unlike conventional check valves, the valve seat may be modified to form the leakage gap. For example, the valve seat may be formed with circumferential grooves in spaced-apart disposition, with the grooves defining with the ball small channels that form the leakage gap.

According to another embodiment of the present invention, a chain tensioner may be provided with a leakage gap that is subdivided in two leakage gaps, wherein one leakage gap is defined, for example, between confronting wall surfaces of the piston and the cylinder, as normally found in conventional chain tensioners. In addition, the present invention provides for an additional leakage gap, the size of which is regulated by the control member, e.g. a valve, wherein the control member clears the additional leakage gap, when the pressure in the pressure chamber drops below a critical lower level, and at least reduces the additional leakage gap in size, when the pressure in the pressure chamber exceeds a critical upper level. In this embodiment, both leakage gaps are effective, when the pressure in the pressure chamber is low, so that the chain tensioner exhibits a soft characteristic damping curve. As soon as the pressure in the pressure chamber reaches the critical upper level, the additional leakage gap is at least reduced in size, suitably closed completely, so that only the other leakage gap is effective, which means that only a reduced leakage rate is attained. Thus, the other leakage gap remains effective over the entire speed range and entire pressure range in the pressure chamber and is suitably constant.

According to another feature of the present invention, the valve body of the valve is configured as plunger which is guided in the cylinder for longitudinal displacement. In this way, the plunger and the cylinder may define together the leakage gap. As an example, confronting plunger and cylinder walls may bound the leakage gap. Suitably, the plunger is biased by a valve spring in a direction toward a first stop, whereby the leakage gap is clear, when the plunger abuts against the first stop, so that motor oil under pressure can migrate through this leakage gap.

According to another feature of the present invention, the plunger is moved away from the first stop to abut against a second stop, when the pressure in the pressure chamber exceeds the upper critical level, to thereby close the leakage gap. Thus, the chain tensioner according to the present invention is changed from a soft damping action to a hard damping action. The second stop may have a seat area for the plunger, whereby the plunger is configured to tightly bear against the seat area. For example, the plunger may have an end face, which tightly bears upon the seat area, so that motor oil in the annular gap between piston and cylinder cannot migrate through the additional leakage gap.

According to another feature of the present invention, the plunger may have integrated therein a check valve, so that plunger and check valve form a structural unit. This can be implemented in a simple manner by providing the bottom of the plunger with an opening with a valve seat for a closing body, e.g. a ball.

BRIEF DESCRIPTION OF THE DRAWING

Other features and advantages of the present invention will be more readily apparent upon reading the following description of preferred exemplified embodiments of the invention with reference to the accompanying drawing, in which.

DETAILED DESCRIPTION OF PREFERRED EMBODIMENTS

Figure 1:
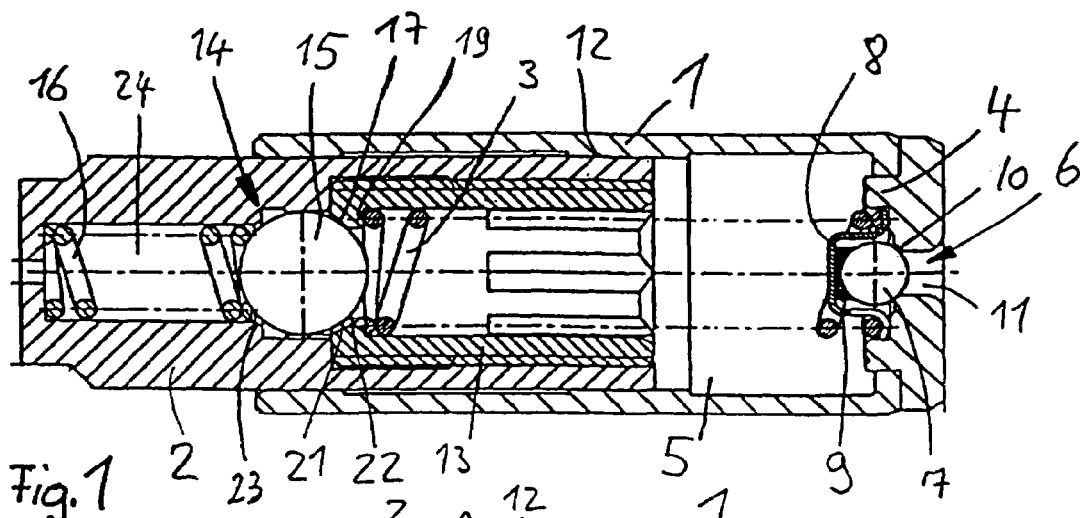
FIG. 1 is a longitudinal section of one embodiment of a chain tensioner according to the present invention in a first operative state.

Turning now to the drawing, and in particular to FIG. 1, there is shown a longitudinal section of one embodiment of a chain tensioner according to the present invention, attached to a, not shown, cylinder head (or engine block) of an internal combustion engine, for keeping a power transmitting member (not shown), such as a chain of a chain drive in a tensioned state.

It is to be understood that the principles described in the following description with respect to a chain tensioner are generally applicable to any other type of tensioner which generally follows the concepts outlined here. For convenience and sake of simplicity, FIG. 1 and the following description refer only to those areas of the chain tensioner that form part of the present invention and are necessary for the understanding.

The chain tensioner includes a cylinder 1 and a tensioner piston 2, which is received in the cylinder 1 for axial displacement in the direction of the chain. The cylinder 1 has a bottom 4 for supporting one end of a helical compression spring 3 which biases the piston 2 in a direction of the chain. The piston 2 and the cylinder 1 define together a pressure chamber 5 for hydraulic fluid, e.g. motor oil. The bottom 4 has a passageway 11 which is fluidly connected to the pressure chamber 5, whereby the flow of hydraulic fluid through the passageway 11 is controlled by a check valve, generally designated by reference numeral 6 and disposed in the cylinder bottom 4. The check valve 6 cuts a fluid flow, when the pressure in the pressure chamber 5 is greater than a pressure outside of the cylinder 1, and includes a ball 7, a hood 8 projecting inwardly from and mounted to the bottom 4, a spring 9 extending between the ball 7 and the hood 8, and a ball seat 10 for the ball 7.

Formed between the cylinder 1 and the piston 2 is a first leakage gap 12 through which hydraulic fluid can issue out of the pressure chamber 5, when the piston 2 is moved inwards, whereby the volume of the pressure chamber 5 is reduced.

Fitted in the piston 2 is a bushing 13 which is formed at its bottom-distal end with an inwardly directed shoulder 19 for supporting the other end of the helical spring 3. The bottom-distal end of the bushing 13 is configured with a conical wall 20 to define a substantially conical bore, thereby forming a first valve seat 17 for a ball 15 of a valve, generally designated by reference numeral 14. The valve 14 is arranged in the tensioner piston 2 and includes a valve spring 16 which extends between an inside wall surface of the piston 2 and the ball 15 and biases the ball 15 against the valve seat 17. The conical wall 20 has formed therein several circumferentially spaced grooves 21 to define a second leakage gap 22.

At a bushing-distal area facing the ball 15, the piston 2 is formed with a conical wall 23 for defining a second valve seat 18. The ball 15 is tightly seated against the valve seat 18, when the ball 15 is moved away from the valve seat 17 against the valve seat 18. A channel 24 is provided behind the valve seat 18 for communication with the surrounding area of the chain tensioner or atmosphere.

Figure 2:
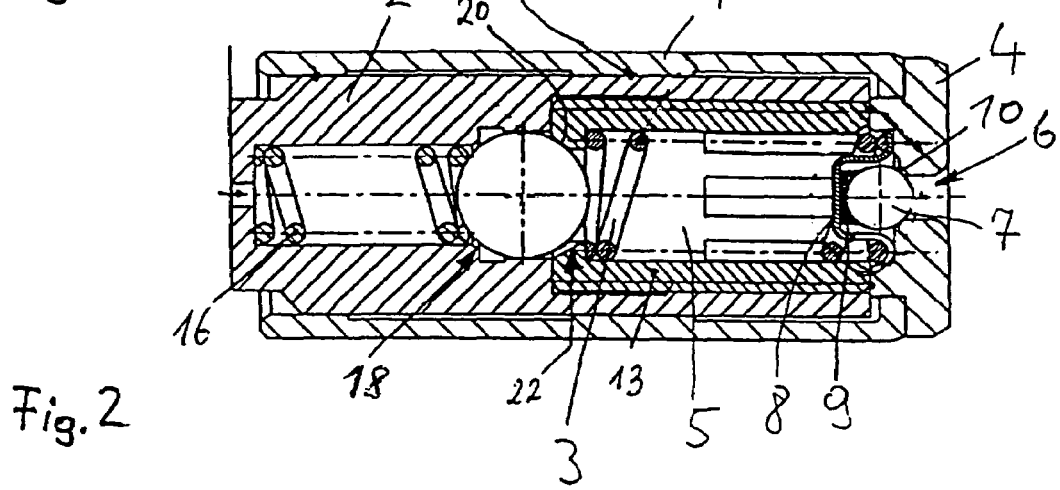
FIG. 2 is a longitudinal section of the chain tensioner of FIG. 1 in a second operative state.

While FIG. 1 shows the tensioner piston 2 in a first operative state, in which the piston is moved out, FIG. 2 shows the operative state, in which the piston 2 is moved in.

The chain tensioner according to the invention operates as follows: During operation of the chain tensioner, the piston 2 oscillates within the cylinder 1. When the piston 2 moves inwards, the volume of the pressure chamber 5 decreases so that hydraulic fluid seeps through the leakage gap 12 and the leakage gap 22. The leakage flow is hereby subdivided in a first partial stream, which is routed between the cylinder 1 and the piston 2 into the surrounding, and a second partial stream, which is conducted between the ball 15 of the valve 14 and the conical wall 20 of the bushing 13 and between the ball 15 and the conical wall 23 of the piston 2, and ultimately via the channel 24 into the surrounding. This split of the leakage flow is maintained so long as the pressure in the pressure chamber 5 does not drop below a critical lower level so that the ball 15 is held by the valve spring 16 in abutment against the valve seat 17, with hydraulic fluid migrating through the grooves 21 (leakage gap 22).

As soon as the pressure in the pressure chamber 5 reaches a critical upper level as a result of rapid chain knocks, the elevated pressure applies on the ball 15 of the valve 14 a force which is greater than the force applied by the valve spring 16 so that the ball 15 is shifted away from the valve seat 17 to the second valve seat 18. When abutting against the valve seat 18, the hydraulic connection between the pressure chamber 5 and the pressureless channel 24 is cut as the valve 14 seals off the leakage gap 22. Thus, the leakage gap 22 is ineffective and the hydraulic fluid can no longer leak through the leakage gap 22. As a consequence, hydraulic fluid can now only leak through the leakage gap 12, so that the inward movement of the piston 2 is damped much harder and the piston 2 cannot sink as far as would be the case when both leakage gaps 12, 22 were open.

The harder damping action at greater pressure has the effect that the helical compression spring 3 is able to more rapidly push the piston 2 outwards, whereby the check valve 6 opens to allow intake of hydraulic fluid into the pressure chamber 5.

The chain tensioner according to the invention eliminates collapse of the chain tensioner, a problem experienced by conventional chain tensioners under peak load, when more motor oil is pressed out of the pressure chamber than can be aspirated in the relaxed phase. This problem is encountered in conventional chain tensioners in particular when the leakage gap is too large, thus set for a soft damping action, or at high motor speeds that allow only short intake times for renewed charging of the pressure chamber. When insufficient amounts of motor oil are available in the pressure chamber, a sudden load will cause the piston to move inwards to such an extent as to mechanically strike internal parts. As a result, very high force peaks are experienced in the chain drive, ultimately leading to a destruction of the chain drive. This problem is now eliminated by the chain tensioner according to the present invention.

Figure 3:
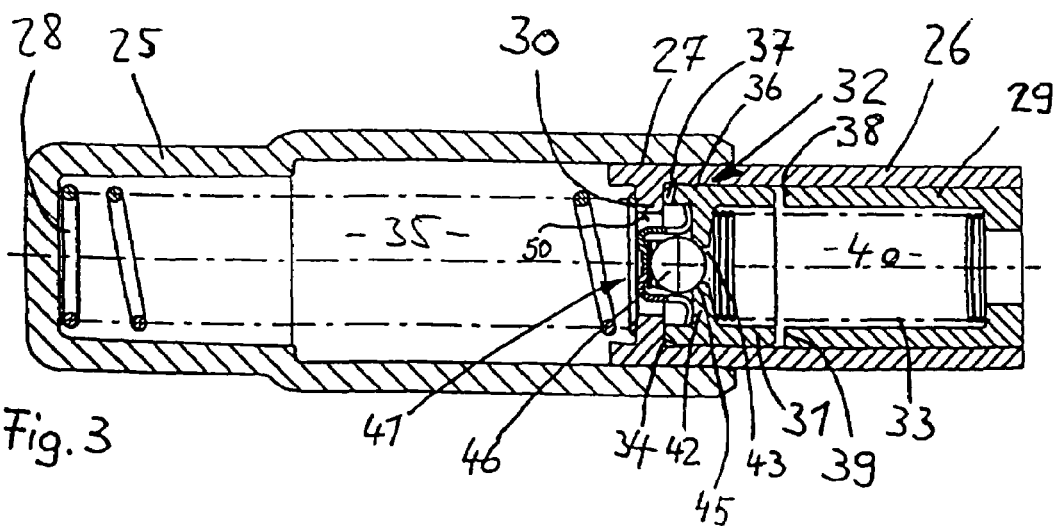
FIG. 3 is a longitudinal section of another embodiment of a chain tensioner according to the present invention in a first operative state.

Turning now to FIG. 3, there is shown a longitudinal section of another embodiment of a chain tensioner according to the present invention in a first operative state. In this embodiment, the chain tensioner has a tensioner piston 25 which is configured as hollow sheet metal part. A cylinder 26 is inserted in the hollow piston 25 and defines an interior space 40 which is hydraulically connected with the surrounding of the chain tensioner. The piston 25 and the cylinder 26 demarcate with their confronting surface areas a first leakage gap 27. A helical compression spring 28 biases the tensioner piston 25 against the, not shown, chain. Securely fitted in the cylinder 26 is a bushing 29. On its bushing-distal end, the cylinder 26 has a bottom 30. Arranged within the interior space 40 of the cylinder 26 in axial alignment with the bushing 29 is a plunger 31, which is biased by a valve spring 33 of a valve 32 against the bottom 30. When the plunger 31 bears against the bottom 30, a first piston stop is defined.

The valve 32 is hydraulically connected via a recess 50 in the cylinder bottom 30 to a pressure chamber 35, which is defined by the tensioner piston 25 and the cylinder 26.

The plunger 31 and the cylinder 25 bound with their confronting surface areas a second leakage gap 36 for seepage of hydraulic fluid out of the pressure chamber 35. The plunger 31 is formed about its bottom-confronting end face with several, circumferentially spaced notches 37 which ensure a reliable fluid transfer from the pressure chamber 35 to the leakage gap 36.

The plunger 31 is moved away from the stop 34 against a stop 38 by a pressure force, when the pressure in the pressure chamber 35 exceeds a critical upper level. The stop 38 has a seat area 39 which is formed by a piston-confronting end face of the bushing 29. When the plunger 31 abuts with its end face against the seat area 39, hydraulic fluid collected in the leakage gap 36 can no longer leak into the interior space 40 of the bushing 29. Thus, only the leakage gap 27 is effective in this situation.

The plunger 31 is combined with a check valve 41 to a structural unit, whereby the plunger 31 has a bottom 42 formed with an opening 43, with the opening-encircling wall of the bottom 42 defining a valve seat 45 for a ball 46 of the check valve 41. The check valve 41 corresponds otherwise to the configuration of the afore-described check valve 6 of FIG. 1. When the check valve 41 opens, hydraulic fluid can be aspirated from the interior space 40 via the opening 43 into the pressure chamber 35.

Of course, the chain tensioner may also be designed in such a manner that the leakage gap 27 is omitted altogether, and the leakage gap 36 constitutes the only leakage gap. In this case, when the plunger 31 abuts against the second stop 38, the leakage gap in the second stop 38 is still maintained open to allow migration of hydraulic fluid into the interior space 40, whereby this leakage gap is smaller than the leakage gap in the first stop 34. Thus, the leakage gap 36 remains open in this case, its size being regulated by the plunger 31 in dependence on the outer diameter of the plunger 31 and the innerdiameter of cylinder 26. In contrast thereto, when the chain tensioner is provided also with leakage gap 27 between the tensioner piston 25 and the cylinder 26, the leakage gap 36 is completely closed, when the plunger 31 abuts against the stop 38.

Function and mode of operation of the chain tensioner according to FIG. 3 corresponds to the function and mode of operation of the chain tensioner according to FIGS. 1 and 2, so that further description is omitted for the sake of simplicity.

While the invention has been illustrated and described as embodied in a chain tensioner, it is not intended to be limited to the details shown since various modifications and structural changes may be made without departing in any way from the spirit of the present invention.

What is claimed as new and desired to be protected by Letters Patent is set forth in the appended claims.

What is claimed is:

1. A chain tensioner, comprising:
a tensioner piston bearing upon a chain;
a cylinder guiding the piston for movement in a direction of the chain and bounding with the piston a pressure chamber for receiving hydraulic fluid;
a leakage gap for migration of hydraulic fluid from the pressure chamber; and
a control member for at least reducing the leakage gap in size, when a pressure in the pressure chamber increases.

2. The tensioner of claim 1, wherein the control member is a valve having a valve body for bounding the leakage gap, said valve body being configured for displacement to at least reduce the leakage gap in size, when the pressure in the pressure chamber increases.

3. The tensioner of claim 2, wherein the valve body is configured as plunger, which is guided in the cylinder for longitudinal displacement.

4. The tensioner of claim 3, wherein the plunger defines the leakage gap in concert with the cylinder.

5. The tensioner of claim 3, and further comprising a valve spring for biasing the plunger in a direction toward a first stop, said piston clearing the leakage gap, when abutting against the first stop.

6. The tensioner of claim 5, wherein the plunger is moved away from the first stop to abut against a second stop, when the pressure in the pressure chamber exceeds the upper critical level, to thereby close the leakage gap.

7. The tensioner of claim 6, wherein the second stop has a seat area for the plunger, whereby the piston is configured to tightly bear against the seat area.

8. The tensioner of claim 3, and further comprising a check valve integrated in the plunger, so that the plunger and the check valve form a structural unit.

9. The tensioner of claim 2, wherein the valve body clears the leakage gap, when the pressure in the pressure chamber drops below a critical lower level, and at least reduces the leakage gap in size, when the pressure in the pressure chamber exceeds a critical upper level.

10. The tensioner of claim 2, and further comprising a first stop, wherein the valve body clears the leakage gap, when abutting against the first stop.

11. The tensioner of claim 10, wherein the first stop is formed by a valve seat, which defines the leakage gap in concert with the valve body.

12. The tensioner of claim 10, and further comprising a valve spring for biasing the valve body against the first stop.

13. The tensioner of claim 12, wherein the valve body is moved away from the first stop in opposition to a spring action applied by the valve spring, as the pressure in the pressure chamber increases.

14. The tensioner of claim 2, and further comprising a second stop, wherein the valve body is configured to abut the second stop, when the pressure in the pressure chamber increases to thereby at least reduce the leakage gap in size.

15. The tensioner of claim 14, wherein the second stop forms a valve seat for the valve body.

16. The tensioner of claim 1, wherein the control member is a valve in communication with the pressure chamber.

17. The tensioner of claim 1, wherein the leakage gap is subdivided in a first leakage gap portion and a second leakage gap portion, wherein the control member clears the first leakage gap portion, when the pressure in the pressure chamber drops below a critical lower level, and at least reduces the second leakage gap portion in size, when the pressure in the pressure chamber exceeds a critical upper level.

18. The tensioner of claim 17, wherein the control member is a valve having a valve body which closes the second leakage gap portion, when the pressure in the pressure chamber exceeds the critical upper level.

19. The tensioner of claim 18, and further comprising a first stop, wherein the valve body abuts against the first stop to clear the second leakage gap portion, when the pressure in the pressure chamber drops below the critical lower level.

20. The tensioner of claim 19, and further comprising a valve spring for biasing the valve body against the first stop.

21. The tensioner of claim 19, wherein the first stop is formed as valve seat for the valve body.

22. The tensioner of claim 19, and further comprising a second stop, wherein the valve body abuts against the second stop to at least reduce the second leakage gap in size, when the pressure in the pressure chamber exceeds the critical upper level, wherein the valve body is disposed between the first and second stops.

23. The tensioner of claim 18, and further comprising a second stop, wherein the valve body abuts against the second stop to at least reduce the second leakage gap portion in size, when the pressure in the pressure chamber exceeds the critical upper level.

24. The tensioner of claim 23, wherein the second stop is formed as valve seat for the valve body.

25. A chain tensioner, comprising:
a tensioner piston bearing upon a chain;
a cylinder guiding the piston for movement in a direction of the chain and bounding with the piston a pressure chamber for receiving hydraulic fluid; and
a control member for regulating a fluid flow through a leakage gap to the outside in dependence on a pressure in the pressure chamber to thereby adjust a damping behavior during operation, wherein the control member is movable between first and second stops and spring-biased to seek a position against a first stop, wherein the first stop has passageways to allow seepage of hydraulic fluid through the leakage gap, wherein the control member moves toward the second stop to at least reduce the fluid flow through the leakage gap, as the pressure in the pressure chamber rises.

26. The chain tensioner of claim 25, wherein the first seat is formed with circumferential grooves to define the passageways.

27. The chain tensioner of claim 25, wherein the control member is a ball valve disposed between the first and second stops.

28. The chain tensioner of claim 25, wherein the control member is a plunger disposed between the first and second stops.

29. A chain tensioner, comprising:
a tensioner piston bearing upon a chain;
a cylinder guiding the piston for movement in a direction of the chain and bounding with the piston a pressure chamber for receiving hydraulic fluid;
a first leakage gap formed between adjacent wall surfaces of the cylinder and the piston for migration of hydraulic fluid from the pressure chamber;
a second leakage gap for migration of hydraulic fluid from the pressure chamber; and
a control member for reducing a fluid flow through the second leakage gap, as the pressure in the pressure chamber rises.

30. The chain tensioner of claim 29, wherein the control member closes the second leakage gap, when the pressure in the pressure chamber exceeds an upper limit.

* * * * *